E. D. SIMONS.
SNAP FASTENER SOCKET.
APPLICATION FILED APR. 24, 1915.
1,192,947.
Patented Aug. 1, 1916.
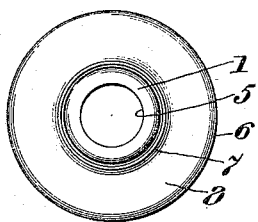
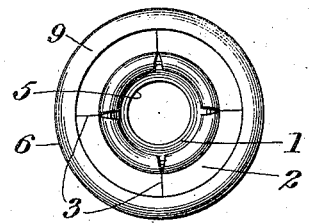
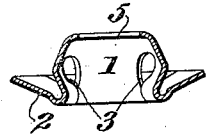
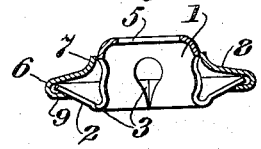
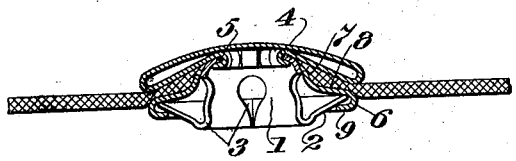
Inventor
Ernest D. Simons
by W. N. Finckel
Attorney

UNITED STATES PATENT OFFICE.

ERNEST D. SIMONS, OF WATERBURY, CONNECTICUT, ASSIGNOR TO SCOVILL MANUFACTURING COMPANY, OF WATERBURY, CONNECTICUT, A CORPORATION OF CONNECTICUT.

SNAP-FASTENER SOCKET.

1,192,947.     Specification of Letters Patent.     Patented Aug. 1, 1916.

Application filed April 24, 1915. Serial No. 23,601.

*To all whom it may concern:*

Be it known that I, ERNEST D. SIMONS, a citizen of the United States, residing at Waterbury, in the county of New Haven and State of Connecticut, have invented a certain new and useful Improvement in Snap-Fastener Sockets, of which the following is a full, clear, and exact description.

The object of this invention is to provide a spring socket for snap fasteners with means for preventing the snap action from being spoiled, or, in other words, for guarding the spring elements from being sprung beyond their elastic limit or otherwise deformed or unduly strained.

The invention consists of a spring socket member having a base flange formed of portions of the spring elements extended out laterally from the stud-receiving portion and inclosed with a loosely-fitting inelastic rim-piece, which will prevent the spoiling of the snap action in setting the socket upon an article, and will effectually guard against undue spreading of the base flange under strain of the stud and insure against exceeding the elastic limit of the socket while permitting the necessary resilient action of the socket in connection with its engagement with, retention of and separation from the stud and will afford an extended surface between which and the fastener the article on which the socket is set is gripped, as I will proceed now to explain and finally claim.

The invention is herein illustrated and explained in connection with the type or style of socket and its fastener shown in Patent No. 757,196, dated April 12, 1904, and having a common owner, although the invention is applicable to other styles of resilient sockets.

In the accompanying drawings illustrating the invention, in the several figures of which like parts are similarly designated, Figure 1 is a top plan view, and Fig. 2 is an inverted plan view of the socket. Fig. 3 is a cross-section of the socket without the rim-piece, and Fig. 4 is a similar view with the rim-piece. Fig. 5 is a cross-section showing the socket set.

The socket comprises a hollow portion 1 and a flange 2 divided by four, more or less, slits 3, which extend radially from within the portion 1 through the flange, thus dividing the socket into a number of spring elements which yield to permit engagement with and disengagement from the complemental stud or head member of the snap fastener and contract about the stud member when it has entered the hollow portion to insure the engagement of the socket and stud. Such a socket is usually attached to a garment or article by placing it on one side and then inserting a suitable fastener 4 from the other side through a hole in the article and an opening 5 in the hollow portion and clenching it inside the hollow portion, as seen in Fig. 5. The flange engages the article on one side or the inner side, and the head of the fastener engages it upon the opposite side or outside, and the article is clamped between the two so that the socket is firmly fixed to the article. Sometimes when the socket is thus fixed or set upon thin material especially, it will open along the lines of its slits sufficiently to spoil the snap action, or, in other words, destroy or seriously impair its resiliency. In order to avoid this defect, I inclose the flange with a rim-piece 6 of inelastic material and of greater diameter than the flange and fitted loosely thereon so as to permit a restricted spread of the spring elements of the socket without impairing their resiliency or exceeding the elastic limit of the socket. This rim piece may comprise the collar portion 7 encircling the hollow portion of the socket near its top and the flange portion 8 extending thence continuously over the upper portion of the flange to its periphery and over such periphery, and the portion 9 underlying the under side of the flange, thus forming a sort of pocket within which the flange is arranged and capable of resilient action but incapable of such spreading as to impair the resiliency of the socket. This rim-piece thus prevents the undue spreading of the socket when used on articles especially those made of thin material both in the act of setting the socket and when in use. The engagement of the rim-piece with the hollow portion of the socket near its top prevents the undue spreading out of this hollow portion in the act of setting, and as will be seen by reference to Fig. 5, this rim affords an extended solid surface opposed to the under surface of the fastening device 4 whereby an enlarged gripping surface upon the article to which the socket is attached is obtained.

What I claim is:—

1. A snap fastener socket, having a hollow portion for receiving the complemental stud or head member, and a laterally projecting flange, the hollow portion and flange slitted radially to render the socket resilient, and a loose-fitting rim-piece encircling the hollow portion near its top portion and extending thence solidly to the flange and overlying said flange and inclosing the rim of the flange, whereby the undue yielding of both the hollow portion and the flange of the socket and their deformation are prevented and an enlarged surface for gripping the article on which the socket is set is provided.

2. A snap fastener socket, having a hollow portion for receiving the complemental stud or head member, and a laterally projecting flange, the hollow portion and flange slitted radially to render the socket resilient, and a loose-fitting rim-piece encircling the hollow portion and extending thence continuously over the top of the flange, about its rim and underneath the flange and enough larger than these parts to permit a limited resilient action of the flange.

In testimony whereof I have hereunto set my hand this 23d day of April A. D. 1915.

ERNEST D. SIMONS.

Witnesses:
CHARLES FEHL,
G. F. HODGES.